(12) United States Patent
Luo et al.

(10) Patent No.: US 7,042,342 B2
(45) Date of Patent: May 9, 2006

(54) REMOTE KEYLESS ENTRY TRANSMITTER FOB WITH RF ANALYZER

(75) Inventors: Yi Luo, Detroit, MI (US); Qingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 190 days.

(21) Appl. No.: 10/864,614

(22) Filed: Jun. 9, 2004

(65) Prior Publication Data

US 2005/0275511 A1    Dec. 15, 2005

(51) Int. Cl.
 *B60R 25/10* (2006.01)
(52) U.S. Cl. .................... 340/426.17; 340/426.13; 340/426.15; 340/426.35
(58) Field of Classification Search .......... 340/426.17, 340/426.13, 426.15, 426.35
See application file for complete search history.

(56) References Cited

U.S. PATENT DOCUMENTS

| | | | | |
|---|---|---|---|---|
| 6,028,537 A | * | 2/2000 | Suman et al. ................ | 340/988 |
| 6,037,859 A | * | 3/2000 | Flick ...................... | 340/426.17 |
| 6,243,022 B1 | | 6/2001 | Furukawa | |
| 6,363,324 B1 | | 3/2002 | Hildebrant | |
| 6,424,301 B1 | | 7/2002 | Johnson et al. | |
| 6,429,543 B1 | | 8/2002 | Desai | |
| 6,529,142 B1 | | 3/2003 | Yeh et al. | |
| 6,696,983 B1 | | 2/2004 | Tang et al. | |
| 6,819,229 B1 | * | 11/2004 | Ghabra et al. ......... | 340/426.36 |
| 6,906,612 B1 | * | 6/2005 | Ghabra et al. ............. | 340/5.61 |
| 2002/0078363 A1 | | 6/2002 | Hill et al. | |

* cited by examiner

*Primary Examiner*—Daryl C Pope
(74) *Attorney, Agent, or Firm*—MacMillan, Sobanski & Todd, LLC

(57) ABSTRACT

A portable remote keyless entry fob has a plurality of control elements disposed on the fob for manual activation by a user. A display is provided for displaying information to the user. An RKE transmitter wirelessly transmits RKE messages from the fob to a vehicle-mounted receiver. A wideband receiver receives RF signals broadcast by wireless devices nearby the fob and generates a received signal strength indicator (RSSI) signal in proportion to the RF signals. A controller is coupled to the plurality of control elements, the display, the RKE transmitter, and the wideband receiver wherein the controller has an RKE mode for providing a plurality of remote entry command functions. The controller has a detector mode for detecting presence of a wireless device using a comparison responsive to predetermined signal patterns and the RSSI signal. The controller generates an indication on the display when the wireless device is detected.

20 Claims, 2 Drawing Sheets

REMOTE KEYLESS ENTRY TRANSMITTER FOB WITH RF ANALYZER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a remote keyless entry transmitter with supplemental functions, and, more specifically, to providing an RF analyzer on a fob integrating remote keyless entry functions with wireless device detection functions.

Advancements in microelectronics have led to widespread use of wireless radio frequency devices of many different types. Applications include remote control of electronic devices, information broadcasting, passive RF sensing, and point-to-point data networking, for example. Remote keyless entry (RKE) systems for automotive vehicles utilize a miniature transmitter contained in a key fob to broadcast remote entry commands to a vehicle receiver to allow a user to remotely lock and unlock doors and perform other convenience functions. Since the key fob must be small in size in order to facilitate carrying in a user's pocket or purse, battery size is limited. Thus, energy efficient microelectronic circuits and methods of operation are necessary in order to minimize battery consumption and maximize battery life.

A person may sometimes desire to discover nearby wireless devices that may be operating. For example, the user of a portable computer such as a laptop may wish to discover whether a wireless access point or "hotspot" is available in a particular area for connecting with a digital network such as the Internet. By ascertaining the presence of a wireless access point, the user can activate their wireless-enabled computing device to interact with the wireless network.

Wireless security and surveillance systems are known that utilize remote sensors such as video cameras to wirelessly transmit sensor signals such as video signals to a base station. Remote monitoring can enhance personal security, but can also result in an invasion of privacy if misused. Therefore, wireless camera detectors have been introduced for sensing the wireless transmissions from a hidden wireless camera. Known RF detectors are dedicated units typically providing only a limited set of detector functions and often having a large size making them inconvenient to carry on a full time basis. Other wireless devices that may be in use in the vicinity of the person, and for which the person may want to detect, include wireless voice communicators such as cordless telephones and walkie-talkies.

The relatively large size of typical known RF detectors has allowed the use of large batteries. To miniaturize a detector, smaller batteries must be used. However, prior art detection methods are relatively inefficient and would provide insufficient battery life when used with a miniaturized (e.g., button) battery. Combining an RF detector with other functions further complicates the problem of battery capacity.

SUMMARY OF THE INVENTION

The present invention advantageously combines remote keyless entry functions and wireless device detection functions in an efficient and cost-effective manner that minimizes power consumption to provide long battery life.

In one aspect of the invention, a portable remote keyless entry fob comprises a plurality of control elements disposed on the fob for manual activation by a user. A display is provided for displaying information to the user. An RKE transmitter wirelessly transmits RKE messages from the fob to a vehicle-mounted receiver. A wideband receiver receives RF signals broadcast by wireless devices nearby the fob and generates a received signal strength indicator (RSSI) signal in proportion to the RF signals. A controller is coupled to the plurality of control elements, the display, the RKE transmitter, and the wideband receiver wherein the controller has an RKE mode for providing a plurality of remote entry command functions in response to activation of respective ones of the control elements. The controller has a detector mode initiated by a predetermined one of the control elements for detecting presence of a wireless device using a comparison responsive to predetermined signal patterns and the RSSI signal. The controller generates an indication on the display when the wireless device is detected. The controller returns to the RKE mode from the detector mode in response to activation of a selected one of the control elements.

DETAILED DESCRIPTION OF PREFERRED EMBODIMENTS

Figure 1:
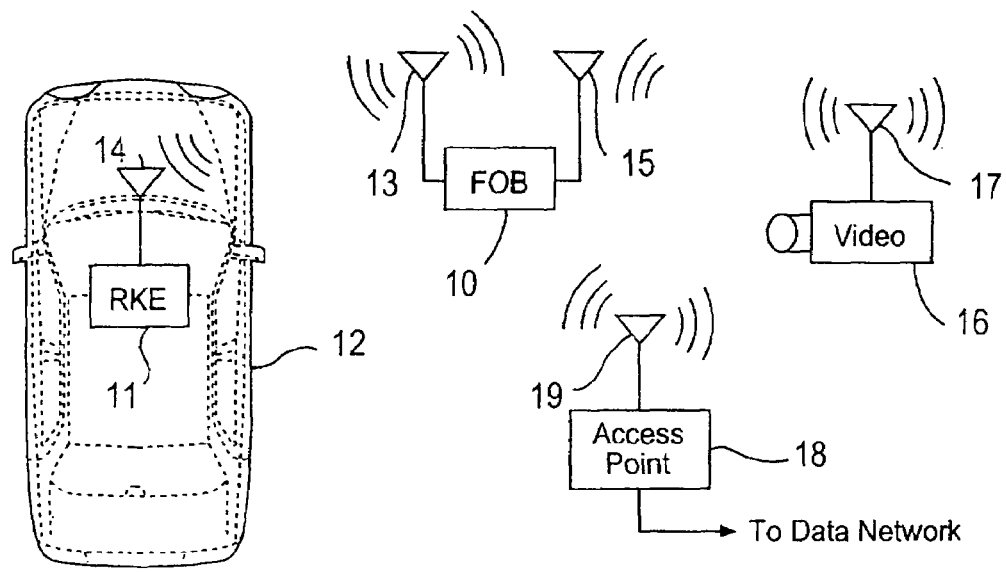
FIG. 1 is a block diagram of the overall system of the present invention.

Referring to FIG. 1, a remote keyless entry (RKE) key fob 10 communicates with an RKE receiver module 11 in a vehicle 12. Fob 10 includes a transmit antenna 13 for radiating signals that are picked up by a receiving antenna 14 connected to RKE module 11.

Fob 10 is an integrated RKE transmitter and RF analyzing receiver, and includes a receiving antenna 15. Antenna 15 is a wide band antenna for receiving broadcast signals from a wide variety of nearby wireless devices such as a wireless video camera 16 having a transmit antenna 17 and a wireless access point 18 having a transmit antenna 19. Fob 10 is adapted to receive broadcast signals from nearby wireless devices and to analyze any received signals for detecting a matching profile to indicate a type of wireless device that is present.

Figure 2:
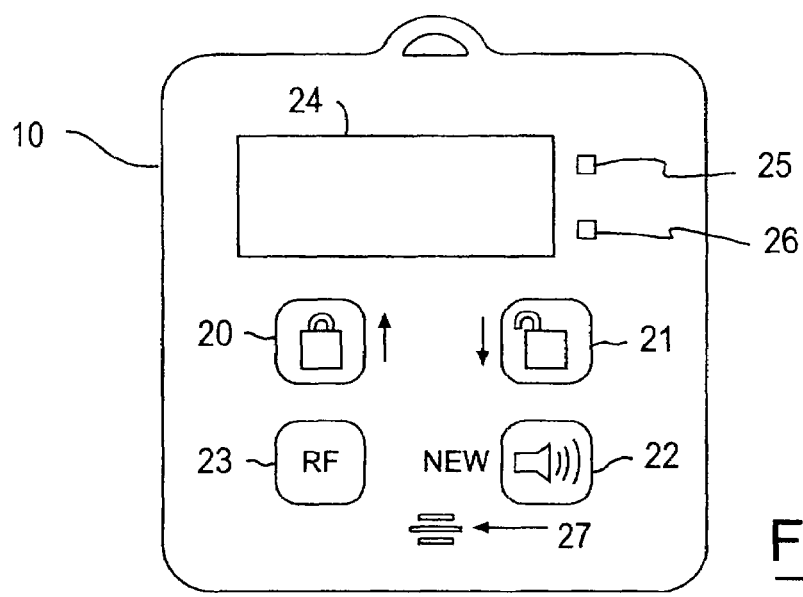
FIG. 2 is a front plan view showing a key fob according to one embodiment of the present invention.

FIG. 2 is a front plan view depicting one embodiment for the outer appearance of fob 10. Standard RKE function buttons include a lock button 20, an unlock button 21, and a panic button 22. For purposes of activating the RF detector function, an RF button 23 is also provided. A graphical/text display 24 is provided for generating an information display when wireless devices are detected. The display may also include indicator lights 25 and 26. The outer shell of fob 10 includes a plurality of sound holes 27 aligned with an interior sound transducer for generating an audible signal when a wireless device is detected.

When in an RF detector mode, buttons 20–22 may preferably invoke RF detector functions as secondary button functions indicated by icons adjacent each button. For example, lock button 20 has an associated upward arrow to indicate an RF detector mode command for increasing detector range while unlock button 21 has a downward arrow corresponding to a detector function of decreasing the detection range. Panic button 22 may correspond to an RF detector function wherein new signal patterns are be learned by the fob in order to detect a particular new wireless device in the future.

Figure 3:
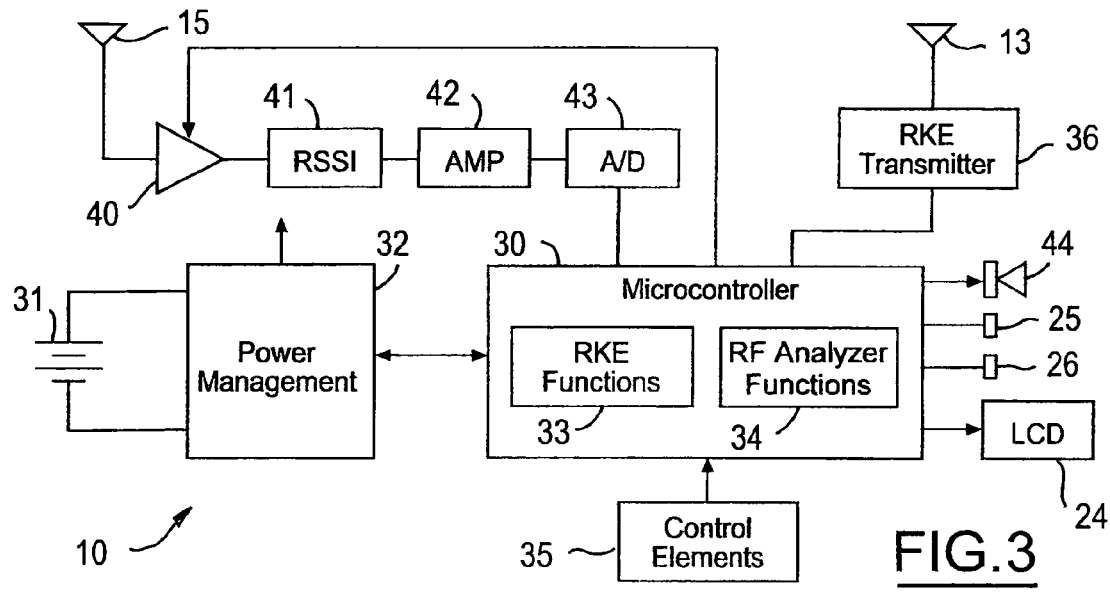
FIG. 3 is a schematic/block diagram showing the key fob in greater detail.

As shown in FIG. 3, fob 10 includes a microcontroller 30 powered by a battery 31 via a power management circuit 32. Power management circuit 32 provides an output voltage for driving each of the electronic components in fob 10 and its operation is controlled by microcontroller 30.

Micro-controller 30 is programmed to perform RKE functions via an RKE programming block 33 when operating in an RKE mode and RF detector/analyzer functions via an RF detector programming block 34 when operating in an RF detector mode. Control elements 35 (e.g., buttons 20–23) are connected to microcontroller 30 in order to provide user input. When in RKE mode, the activation of control elements 35 causes the RKE function programming 33 to generate remote entry commands that are broadcast by an RKE transmitter 36 connected to antenna 13. When placed in the RF detector mode, signals from wideband antenna 15 are coupled to a wideband amplifier 40. Antenna 15 and amplifier 40 preferably provide a frequency spectrum from about 100 MHz to about 3 GHz in order to cover the typical transmission frequencies for wireless cameras, wireless access points, and other target devices.

A received signal strength indicator (RSSI) circuit 41 is connected to wideband amplifier 40 to generate an RSSI signal having a magnitude indicative of the received signal strength seen by wideband amplifier 40. The RSSI signal from circuit 41 is coupled to an amplifier 42 for boosting the voltage range of the RSSI signal to the appropriate range for input to an A/D converter 43. A digitized RSSI signal is provided to microcontroller 30 for use in the RF analyzer functions 34 to detect the presence of predetermined wireless devices. When such a device is detected, a visual indication may be generated using LCD 24, an indicator light 25, or an audible beep from a transducer 44. A light indicator 26 may be illuminated to signify when microcontroller 30 is in the RF detector mode.

Figure 4:
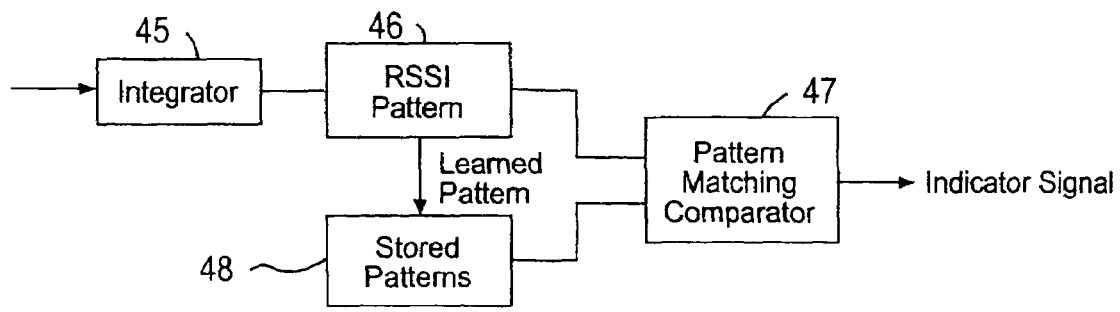
FIG. 4 is a block diagram showing pattern matching performed in the microcontroller of FIG. 3.

Analyzing of broadband RF signals (specifically an RSSI signal) to detect a predetermined wireless device is preferably performed as shown in FIG. 4. An integrator 45 receives an RSSI signal to generate a data frame preferably including a series of integrated values to form an RSSI pattern stored in a block 46. Predetermined stored patterns corresponding to the RSSI patterns exhibited by selected wireless devices are stored in block 48 and are compared to the current RSSI pattern in block 46 using a pattern matching comparator 47 to generate an indicator signal when a sufficiently close match is found. Conventional pattern matching techniques, such as relative amplitude vs. time comparison, may be used. Preferably, the indicator signal includes information identifying the particular wireless device type that generates the stored pattern. When generating a new learned RSSI pattern in a learn mode of the RF detector, an RSSI pattern generated in block 46 is transferred as a new stored pattern in block 48 as shown.

Figure 5:
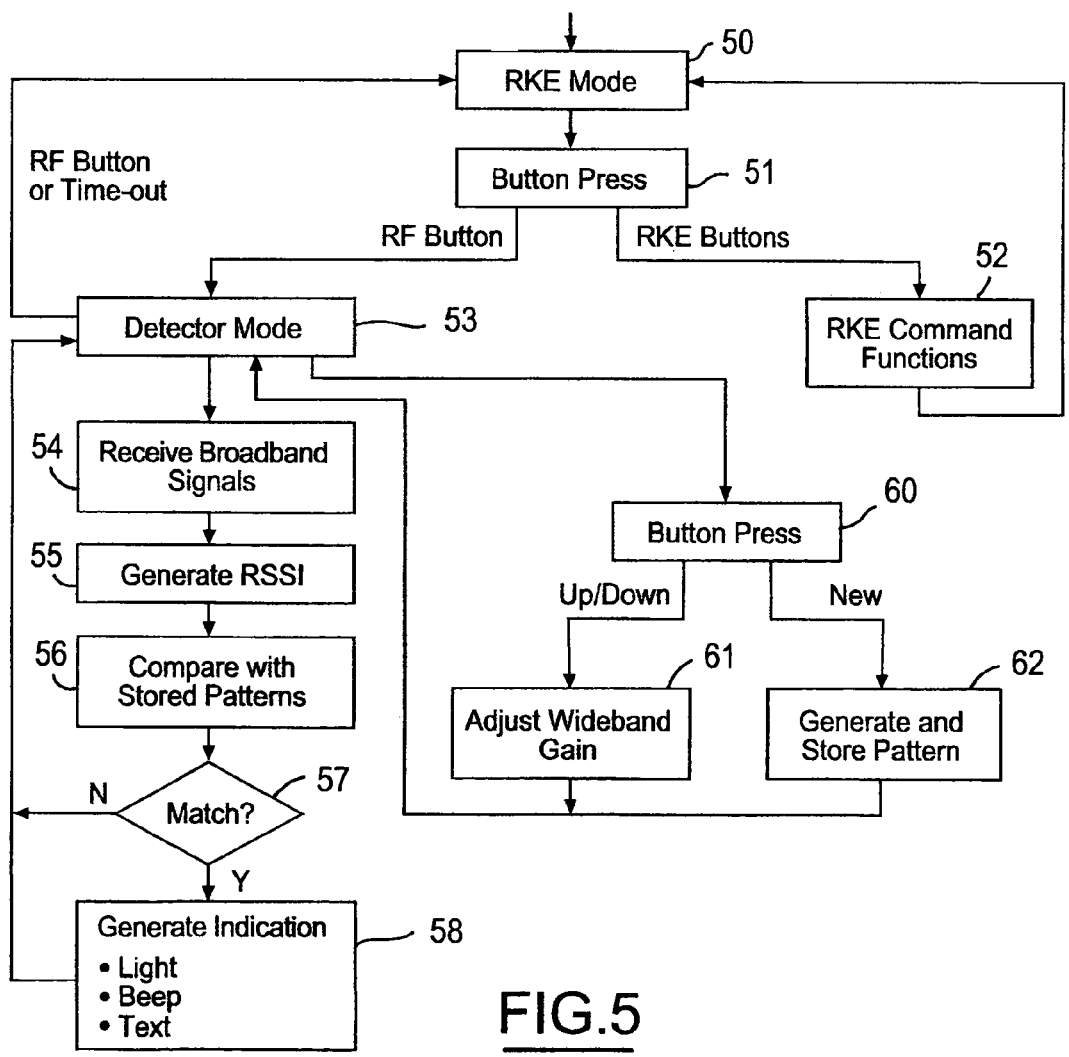
FIG. 5 is a flowchart showing a preferred method of the present invention.

A preferred method of the invention is shown in FIG. 5. Upon initialization, the fob enters the RKE mode at step 50. In step 51, a control element on the fob is pressed. If an RKE button is pressed (e.g., lock, unlock, or panic), then an RKE command function is performed at step 32 and a return is made to step 50.

If the RF button is pressed at step 51, then the fob enters the RF detector mode at step 53. Preferably, the detector mode includes iterative attempts to detect the presence of a nearby wireless device. Thus, broadband RF signals are received in step 54 and an RSSI signal is generated in step 55. In step 56, the RSSI signal is compared with stored patterns. A check is made in step 57 to determine whether a match is found. When a match is found, a detection indicator is generated such as the illumination of an indicator light, an audible beep, or the presentation of text such as a textual indication of the average value of the received signal strength corresponding to the detected device and/or an identification of the type of device that is being detected (e.g., the name of the type of device associated with the stored signal pattern). The displayed RSSI average value can be used to localize the detected transmitter by moving the fob and noting the increasing or decreasing average RSSI signal to find the direction to the detected device. If no match is found in step 57 or after generating the indication in step 58, a return is made to step 53.

In the event that a button is pressed while in the detector mode, then the button press is detected at step 60. If the button press corresponds to an increase or decrease of detector range, then the wideband gain of the wideband amplifier is adjusted in step 61. If the button press corresponds to a request to learn a new device type, then a corresponding pattern is generated and stored in step 62 and a return is made to step 53. In learning a new pattern, the fob should be near the new source and the source must be actively transmitting when the learn button is pressed.

If the RF button is pressed while in detector mode 53, then a return is made to RKE mode 50. In addition, a time-out may be detected while in detector mode 53 after a predetermined period of inactivity (i.e., absence of button presses). The time-out prevents excessive battery drain if the user inadvertently forgets to press the RF button after entering the detector mode.

Due to its efficient operation, use of RSSI signals for comparison, and the automatic time-out of the detector mode, the present invention integrates an RKE transmitter with a wireless device detector and RF analyzer in a manner which is convenient to use, small in size, and avoids excessive battery consumption so that acceptable battery life can be achieved with a miniature battery.

What is claimed is:

1. A portable remote keyless entry fob comprising:
   a plurality of control elements disposed on said fob for manual activation by a user;
   a display for displaying information to said user;
   an RKE transmitter for wirelessly transmitting RKE messages from said fob to a vehicle-mounted receiver;
   a wideband receiver capable of receiving RF signals broadcast by wireless devices nearby said fob and generating a received signal strength indicator (RSSI) signal in proportion to said RF signals;
   and a controller coupled to said plurality of control elements, said display, said RKE transmitter, and said wideband receiver wherein said controller has an RKE mode for providing a plurality of remote entry command functions in response to activation of respective ones of said control elements, wherein said controller has a detector mode initiated by a predetermined one of said control elements for detecting presence of a wireless device using a comparison responsive to predetermined signal patterns and said RSSI signal, wherein said controller generates an indication on said display when said wireless device is detected, and wherein said controller returns to said RKE mode from said detector mode in response to activation of a selected one of said control elements.

2. The fob of claim 1 wherein at least some of said remote entry command functions are deactivated while in said detector mode.

3. The fob of claim 2 wherein said control elements corresponding to said deactivated remote entry command functions activate respective detector functions in said detector mode.

4. The fob of claim 3 wherein said detector functions include increasing detector range and decreasing detector range.

5. The fob of claim 3 wherein said detector functions include a new pattern learning function.

6. The fob of claim 1 further comprising:
an analog-to-digital converter coupled to said wideband receiver and said controller for digitizing said RSSI signal and providing said digitized signal to said controller; and
an integrator for integrating said RSSI signal.

7. The fob of claim 1 wherein said predetermined signal patterns each correspond to a particular wireless device type and wherein said displayed indication identifies a respective device type corresponding to a matching predetermined signal pattern when said wireless device is detected.

8. The fob of claim 1 wherein said displayed indication identifies an average RSSI value when said wireless device is detected.

9. The fob of claim 1 wherein said display includes an indicator light illuminated when said wireless device is detected.

10. The fob of claim 1 wherein said display includes an LCD graphic display.

11. The fob of claim 1 wherein said wireless device is a wireless camera and wherein said wideband receiver has a bandwidth of from about 100 MHz to about 3 GHz.

12. The fob of claim 1 further comprising a sound transducer for generating an audible indication when said wireless device is detected.

13. A method of operating a portable key fob associated with a user's vehicle, said method comprising the steps of:
operating in an RKE mode comprising remote entry command functions for transmitting respective RKE wireless messages to said user's vehicle in response to manual activation of respective control elements contained in said key fob;
entering a detector mode in response to activation of a predetermined control element, wherein said detector mode comprises analyzing a broadband RF signal received by said key fob to detect the presence of predetermined wireless devices; and
returning to said RKE mode in response to manual activation of a selected control element.

14. The method of claim 13 wherein said detector mode comprises the steps of:
receiving said broadband RF signal;
generating a received signal strength indicator (RSSI) signal in response to a received signal strength of said broadband RF signal;
comparing said RSSI signal with predetermined signal patterns; and
generating a detection indicator on a display contained in said key fob in response to a match between said RSSI signal and said predetermined signal patterns.

15. The method of claim 14 wherein said predetermined signal patterns each correspond to a particular wireless device type and wherein said detection indicator identifies a respective device type corresponding to a matching predetermined signal pattern when said wireless device is detected.

16. The method of claim 13 wherein said predetermined control element and said selected control element are comprised of a single push button.

17. The method of claim 13 further comprising the step of:
returning to said RKE mode after a predetermined period of inactivity in said detector mode.

18. The method of claim 13 wherein said detector mode comprises detector functions including increasing detector range and decreasing detector range.

19. The method of claim 13 wherein said detector mode comprises detector functions including a new pattern learning function.

20. The method of claim 13 further comprising the step of:
displaying an average RSSI value on a display contained in said key fob when said wireless device is detected.

* * * * *